(12) United States Patent
Yamashita et al.

(10) Patent No.: US 7,408,267 B2
(45) Date of Patent: Aug. 5, 2008

(54) POSITION MEASURING DEVICE

(75) Inventors: Mamoru Yamashita, Kiyose (JP);
Hiroshi Haga, Fuchu (JP); Takeshi Yamamoto, Hachioji (JP); Andre Schramm, Sagamihara (JP)

(73) Assignee: Dr. Johannes Heidenhain GmbH, Traunreut (DE)

( * ) Notice: Subject to any disclaimer, the term of this patent is extended or adjusted under 35 U.S.C. 154(b) by 357 days.

(21) Appl. No.: 11/055,438

(22) Filed: Feb. 9, 2005

(65) Prior Publication Data

US 2005/0285446 A1    Dec. 29, 2005

(30) Foreign Application Priority Data

Feb. 9, 2004    (JP)    .............................. 2004-032130

(51) Int. Cl.
*B60L 1/00*    (2006.01)
(52) U.S. Cl. .................................... 307/10.1
(58) Field of Classification Search ................. 307/10.1
See application file for complete search history.

(56) References Cited

U.S. PATENT DOCUMENTS 6,651,534 B1 * 11/2003 Sakamaki et al. ............. 82/118

2004/0113033 A1 * 6/2004 Johnson ................... 248/183.3

FOREIGN PATENT DOCUMENTS

| JP | 03-096810 | * | 4/1991 |
| JP | 2000-014047 | | 1/2000 |
| JP | 2004-14047 | | 1/2000 |
| JP | 2001-309577 | * | 4/2000 |
| JP | 2001-309577 | | 11/2001 |
| JP | 2002-213994 | | 7/2002 |

* cited by examiner

*Primary Examiner*—Michael J Sherry
*Assistant Examiner*—Luis Roman
(74) *Attorney, Agent, or Firm*—Kenyon & Kenyon LLP

(57) ABSTRACT

In a position measuring device in which data, which requires buffering, may be held without accommodating a high-capacitance capacitor in the inside of the encoder, a backup current source may be exchanged while the circuits required for the operating capability state remain operable. In addition, current usage during the buffering time may be held low, and the service life of the backup current source may be extended, so that the demand for maintenance may be reduced. The position measuring device may include an encoder main part, arranged to measure the extent of the shift in position of an object to be measured, and a backup current source arranged to supply backup current when main current source, that supplies encoder main part with current, is interrupted. Outside of the encoder main part, an auxiliary current source is provided which, during the exchange of a main battery of the backup current source, undertakes supplying backup current in place of this main battery. The backup current source supplies backup current only to those circuits of the encoder main part which require buffering.

17 Claims, 4 Drawing Sheets

POSITION MEASURING DEVICE

CROSS-REFERENCE TO RELATED APPLICATIONS

The present application claims priority to Japanese Patent Application No. 2004-032130, filed on Feb. 9, 2004, which is expressly incorporated herein in its entirety by reference thereto.

FIELD OF THE INVENTION

The present invention relates generally to a position measuring device. The present invention also relates to a backup current source of a position measuring device which is mounted on the rotor of, e.g., a motor, or on an object moving in a straight line that is to be measured, and determines the extent of the shift in position of the object to be measured, e.g., the revolutions per unit time and/or the angle of rotation or the position of motion, etc.

BACKGROUND INFORMATION

Position measuring devices, e.g., absolute position measuring devices, may have a backup current source in order to prevent the loss, in case of an interruption of the main current source, of data important for the operation of the encoder, such as data indicating the rotational position of a motor or the position of motion.

For example, in the position measuring device illustrated in FIG. 4, there are a primary current source 3, a backup current source 1a (external battery) and a chargeable high capacitance capacitor C1 inside an encoder 2. When primary current source 3 is interrupted, the current required is backed up or buffered by backup current source 1a and high capacitance capacitor C1. That means, at normal operation, a voltage Vcc from primary current source 3 drives a current via nodes n1 and n2 and a diode D24 to the internal circuits. In this context, high capacitance capacitor C1 connected to node n1 is also charged. If an interruption of primary current source 3 occurs, a voltage Vbat drives a current from a battery BAT on the inside of backup current source 1a via nodes n3 and n4 to principal encoder part 2, and via a diode D23 a current supply of internal circuits 23 is undertaken. Since diode D24 is present on the side of primary current source 3, no reverse current of the backup current occurs in this context.

On the inside of backup current source 1a, a normal battery BAT is available, and during an exchange of the battery on account of the service life of this external battery BAT, after a sufficient charging of high capacitance capacitor C1, primary current source 3 is switched off and the external battery current source is exchanged during buffering by the high capacitance capacitor within a period of time during which buffering by high capacitance capacitor C1 is possible.

Such encoders are frequently used for the position report of servomotors, and, because of technical revolution in recent years, downsizing and, on account of the problem of heat development of the motor because of downsizing, high temperature capability is called for in the operating temperature range. However, when the high temperature capability is considered in the operating temperature range, the problem may arise that the buffering capacity decreases in the course of time based on the influence of the heat-conditioned quality decrease of the capacitor, and the buffering time may be reduced. As a high capacitance capacitor for buffering, an electric double layer capacitor may be used, and since this may be extremely large compared to general electronic components, a disadvantageous influence on the downsizing of the encoder or on the layout room on a printed circuit board may be unavoidable.

As regards such backup current sources, for example, in Japanese Published Application No. 2000-014047, an encoder is described that has the task of making available an encoder and its backup method, the capacitor for buffering at a location distant from the encoder being developed in an environment having a different temperature, and the reduction in quality of the capacitor is prevented and the reliability of the buffering activity is increased, and, in addition, limitations with respect to the shape and the dimensions of the encoder itself are removed, and downsizing may be achieved. The encoder described in this publication, in the case of which, after the processing of the detection signal of an encoder detection part for determining rotations or a straight-line motion by electrical circuits connected to the primary current source, an encoder output signal is emitted and at least the encoder detection part and the electrical circuits are disposed in an encoder housing, is arranged such that the buffer capacitor for buffering in response to an interruption in the primary current source is arranged outside the encoder housing, the buffer capacitor being connected to a lead wire extending out of the encoder housing, and being arranged at a location distant from the encoder housing, the lead wire being connected between a diode connected to the primary current source and the electrical circuits, and the buffer capacitor being connected directly to the primary current source.

But, since the encoder described in this publication uses a direct capacitor for buffering the main current source, it may not be practical, since the backup current source may be insufficient and the buffering time may be insufficient. And since, in addition, no distinction is made between the current system fed by the main current source and the current system fed by the backup current source, the current usage may be high even during the buffering, whereby the above problem may become worse, and, in addition, a decrease of the service life of the backup current source itself may occur.

Japanese Published Application No. 2001-309577 describes a backup current supply device that has the task of making available a backup current supply device, the backup battery being able to be safely exchanged without the backup data of an absolute encoder being lost. As far as the construction of the device of this publication is concerned, in this context a backup current supply device is involved in which, in parallel, at least two backup batteries and connecting parts for connecting these batteries are made available, and at least one backup battery is connected to one connecting part, while a new backup battery is connected to the other battery connecting part, so that the backup battery may be safely exchanged and a loss of backup data may be prevented.

However, since even in the device described in this publication no distinction is made between the current system fed by the main current source and the current system fed by the backup current source, the current usage may be high also during the buffering, which is why the problem of the service life of the backup battery may still not be solved.

Japanese Published Application No. 2002-213994 describes a backup current supply device, the task of which is to make available at a favorable price a backup current supply device having excellent reliability and service-proved capability, in which there may be no loss of the data of the absolute encoder of a servo system that are to be buffered. As far as the construction of the device of this patent literature is concerned, a servomotor on which an absolute encoder is arranged, a motor control which controls the servomotor and a backup current supply device is made available. The backup current supply device includes a buffer capacitor connected in parallel to a backup battery. In response to the interruption of the main current source of the absolute encoder, the backup current supply device undertakes the buffering of the data. It is connected to the main current source via a detachable connecting terminal or clamp, so that the exchange of the backup power supply device may be easily possible. Furthermore, in parallel, at least two second connecting terminals are made available for connecting the backup current supply device, and the connecting terminal of the backup current supply device is connected to at least one of the second connecting terminals. Since, during the exchange of the backup current supply device, the new backup current supply device is able to be connected to the second connecting terminal, at which there is no connection, there may not come about any loss in the data that are to be buffered.

However, just as with the publications mentioned above, since no distinction is made between the systems of the main current source and the backup current supply device, the current drain may be high, and similar problems may appear as in the above examples.

SUMMARY

An example embodiment of the present invention may provide a position measuring device in which data, the buffering of which is required, may be kept without the inclusion of a high capacitance capacitor on the inside of the encoder, the backup current source may be exchanged, while the circuits required for the operating capability state remain in working condition, and, in addition, the current usage may be held low during the buffering time, and the service life of the backup current source may be extended, so that the burden of maintenance may be reduced.

According to an example embodiment of the present invention, a position measuring device includes: an encoder main part configured to measure an extent of a shift in position of an object to be measured; a backup current source configured to supply backup current to the encoder main part upon interruption of a main current source that supplies current to the encoder main part, the backup current source including a main battery; and an auxiliary current source arranged outside of the encoder main part configured to supply the backup current during an exchange of the main battery of the backup current source.

The backup current source may be configured to supply the backup current only to circuits of the encoder main part that require buffering.

The backup current source may include a battery.

According to an example embodiment of the present invention, a position measuring device includes: encoder main part means for measuring an extent of a shift in position of an object to be measured; backup current source means for supplying backup current to the encoder main part means upon interruption of a main current source that supplies current to the encoder main part means, the backup current source means including main battery means; and auxiliary current source means arranged outside of the encoder main part means for supplying the backup current during an exchange of the main battery means of the backup current source means.

The backup current source means may be for supplying the backup current only to circuit means of the encoder main part means that require buffering.

The backup current source means may include battery means.

Figure 1:
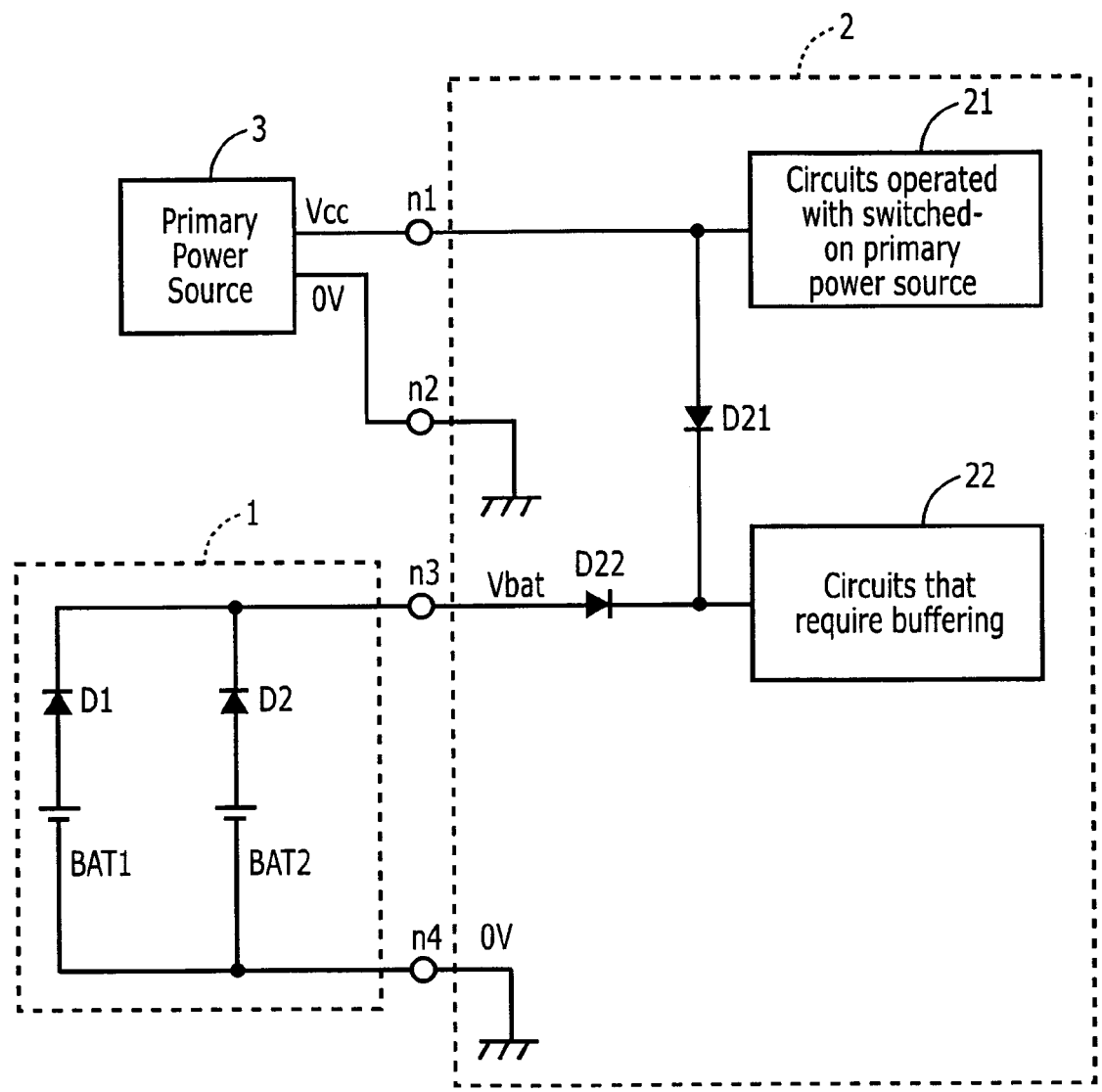
FIG. 1 is a circuit diagram which illustrates an example embodiment of a device of the present invention.

LIST OF REFERENCE CHARACTERS 1 backup current source
2 encoder main part
3 main current source
21 circuits operated when the main current source is switched on
22 circuits that require buffering
23 inner circuits

DETAILED DESCRIPTION

As illustrated in the Figures, a position measuring device includes an encoder main part 2 arranged to measure extent of a position shift of an object to be measured and a backup current source 1 arranged to supply backup current when the main current source 3, which supplies the encoder main part 2 with current, is interrupted. An auxiliary current source is arranged outside the encoder main part. When a main battery BAT1 of backup current source 1 is exchanged, the auxiliary current source undertakes the supply of backup current instead of this main battery BAT1. The backup current source 1 may be arranged to supply backup current only to those circuits 22 of encoder main part 2 that need buffering. The backup current source 1 may include a battery BAT2.

Since, according to example embodiments of the present invention, no high capacitance capacitor is arranged on the inside of the encoder, downsizing of the encoder may be realized, and since the problem of the reduction in buffering time may be solved by the deterioration of capacitance of a capacitor, during the course of time, in a high temperature environment, the high temperature capability may be provided.

Furthermore, current usage may also be reduced during the buffering time, and a longer buffering may be possible, and may also be targeted at a long service life of the current source elements, such as a battery or a capacitor.

A position measuring device of an example embodiment of the present invention includes an encoder main part arranged to measure the extent of the position shift of an object to be measured, and has a backup current source arranged to supply backup current when the main current source, that supplies the encoder main part with current, is interrupted. Outside the encoder main part an auxiliary current source being present which, during the exchange of a main battery of the backup current source, undertakes supplying backup current in place of this main battery.

The backup current source supplies backup current only to the circuits of the encoder main part that require buffering. Consequently, since an auxiliary current source is made available outside the encoder, it may not be necessary to accommodate a high capacitance capacitor on the inside, and the encoder may be able to be designed in a downsized manner. In addition, the problem of the reduction in buffering time by the deterioration of capacitance of a capacitor, during the course of time, in a high temperature environment may be eliminated, and high temperature capability may be possible.

The auxiliary current source may be of the same or similar type as a battery for the main current source, e.g., a secondary battery such as an alkali accumulator, a lead accumulator, a silver oxide battery, a nickel-cadmium battery, a nickel-hydrogen battery, a lithium ion secondary battery, etc., or a primary battery such as a manganese battery, an alkali battery, a lithium battery, an air-alkali battery, etc. From, e.g., these examples, a most appropriate battery may be selected and used. As far as the point in time of the exchange of the auxiliary battery is concerned, the exchange may generally be undertaken in response to the occurrence of a battery voltage monitoring alarm or in response to regular inspections.

Instead of the battery, a super-capacitor, e.g., a capacitor having great capacitance, such as an electric double layer capacitor or an aluminum electrolyte capacitor, etc., may be used, their uses being determined by considerations with respect to current usage of the device, the time required for the exchange, etc.

The auxiliary current source and the main battery may be connected to the encoder respectively by a reverse current prevention element which uses a semiconductor such as a diode, a transistor, an FET, etc., so that no short-circuits or interferences among one another may occur, and also so that no problems may arise if only one of those is connected. They may be connected to the main current source and may be supplied by the main current source with charging current.

As far as the circuits that require buffering are concerned, in this context, for example, elements are involved that hold data which require buffering, or circuits which have to be kept in working condition, and, e.g., elements that store data which show the number of revolutions per time or the extent of the shift in position of the encoder and of a multi-revolution absolute encoder, or which show the position of motion of a linear encoder, as well as the detection circuit for determining the rotational speed, the rotational direction or the extent of motion and the direction of motion and the processing circuit. The elements which store the revolution per time data or the data on the calculated extent of motion, etc., may be volatile semiconductor memory elements such as a RAM, while the detection circuit and the processing circuit form circuits having current usage that is as small as possible, and may use appropriate elements. For example, for the detection circuit, in the case of an optical determination, a light generator or a light receiver may be provided, whereby a light-emitting diode is illuminated in pulse fashion and detected, and a pulse generator which makes available to the above elements time clock pulses, as well as a logic circuit for the subsequent signal processing. In the case of a magnetic detector, a magnetic resistor element having great resistance may be provided. For the processing circuit, a logic circuit arranged to receive a counting signal from two signals having phase difference received by the code plate may be provided along with a counter that counts this signal, e.g., elements having low current usage, such as integrated CMOS circuits may be used.

These semiconductor elements and circuits may also be arranged individually as independent circuits, but, because of technical advancements and the developments of integration technology in the past few years, they may easily be assembled to form one element from integrated elements such as FPGAs, PLDs, ASICs, etc., or microprocessors such as CISCs, RISCs, etc. Inasmuch as these integrated elements and microprocessors have a low current consumption, their use may provide advantages with respect to downsizing.

Referring again to the Figures, example embodiments of the present invention are explained in more detail.

EXAMPLE EMBODIMENT 1

FIG. 1 is a circuit diagram that illustrates an example embodiment of the present invention. In the Figure, on the inside of encoder main part 2, there are circuits 21, which are operated when the main current source is switched on, and circuits 22 that need buffering, the respective currents of which are supplied by separate systems. That means, circuits 21, which are operated when the main current source is switched on, are connected via nodes n1 and n2 to a main current source 3, and are provided by main current source 3 with a current driven by a voltage Vcc. In this example embodiment, circuits 21, which are operated when the main current source is switched on, in the case of a multi-rotation absolute encoder, may be a circuit, for example, for determining the absolute position within one revolution, a processing circuit, an output circuit, etc., and the circuits 22 that require buffering may include a circuit for determining the data of the revolutions per time, a processing circuit, a data storage circuit, etc. In the case of a linear encoder, too, appropriate circuits are present for these circuits, but circuits 22, that require buffering, are formed by a circuit for determining the data for calculating the extent of motion, a processing circuit, a data storage circuit, etc.

Circuits 22, that require buffering, are connected by a node n3, connected via a diode D22 and a node n4 to a backup current source 1, and are supplied by backup current source 1 with a current driven by a voltage Vbat. Circuits 22, that require buffering, are also connected to node n1 via a diode D21, and, when the main current source is switched on, they receive a current supply from the main current source, driven by a voltage Vcc.

A main battery BAT1 and an auxiliary current source BAT2 are present in backup current source 1, and their one terminal (e.g., the anode in the example embodiment illustrated) is in each case connected to node n3 via diodes D1 or D2, and the other terminal of which (e.g., the cathode in the example embodiment illustrated) is connected to node n4.

This means that the main battery BAT1 and the auxiliary current source BAT2 form a diode OR circuit. It may be prevented thereby that interferences or short-circuits occur between main battery BAT1 and auxiliary current source BAT2, and also that no problems may appear if only one of them is connected. It may not be necessary for auxiliary current source BAT2 to be constantly connected, but it may be sufficient if it is connected only during the exchange of main battery BAT1.

In this example embodiment and in the following example embodiments, while a diode is mentioned in place of a reverse current prevention element and is explained, it should be understood that the present invention is not limited to this, but rather, it is possible to substitute other semiconductors, etc., having the same or similar function(s) and/or structure(s), such as a transistor, an FET, etc. Also, individual nodes n1 to n4, which connect the encoder main part and the exterior of the encoder main part, may be terminals, but may also be electrical connecting devices such as plug contacts.

During normal operation, main current source 3 is switched on, current driven by voltage Vcc is supplied by node n1 to circuits 21 which are operated when the main current source is switched on, and current driven by voltage Vcc is supplied to circuits 22, which require buffering, via diode D21. When main current source 3 is interrupted, current driven by a voltage Vbat is supplied by backup current source 1 via node n3, and is fed to circuits 22, which require buffering, via diode D22. In this context, circuits 21, which are operated when the main current source is switched on, are also connected by diode D21, but no current is fed, since current flow takes place in the direction opposite to the pass-through direction of diode D21.

In this manner, when there is an interruption of main current source 3, only circuits 22, which require buffering, are supplied with current by backup current source 1.

When main battery BAT1 of the backup current source is exchanged, this main battery BAT1 may be removed after interruption of main current source 3 and after connection of auxiliary current source BAT2. Thereby, the backup current source, instead of being supplied by main battery BAT1, is supplied by auxiliary current source BAT2. After the exchange of main battery BAT1, auxiliary current source BAT2 is removed. After that, main current source 3 may be switched on again, and the device may be operated.

By using auxiliary current source BAT2, main battery BAT1 may consequently be exchanged even without the availability of a capacitor, etc., on the inside of encoder main part 2. In addition, since in this example embodiment the four nodes n1 to n4 may be sufficient for the terminals for connecting encoder main part 2 to the outside, the arrangement hereof may be realized without changing the number of terminals of the customary units, which may be extremely economical.

EXAMPLE EMBODIMENT 2

Figure 2:
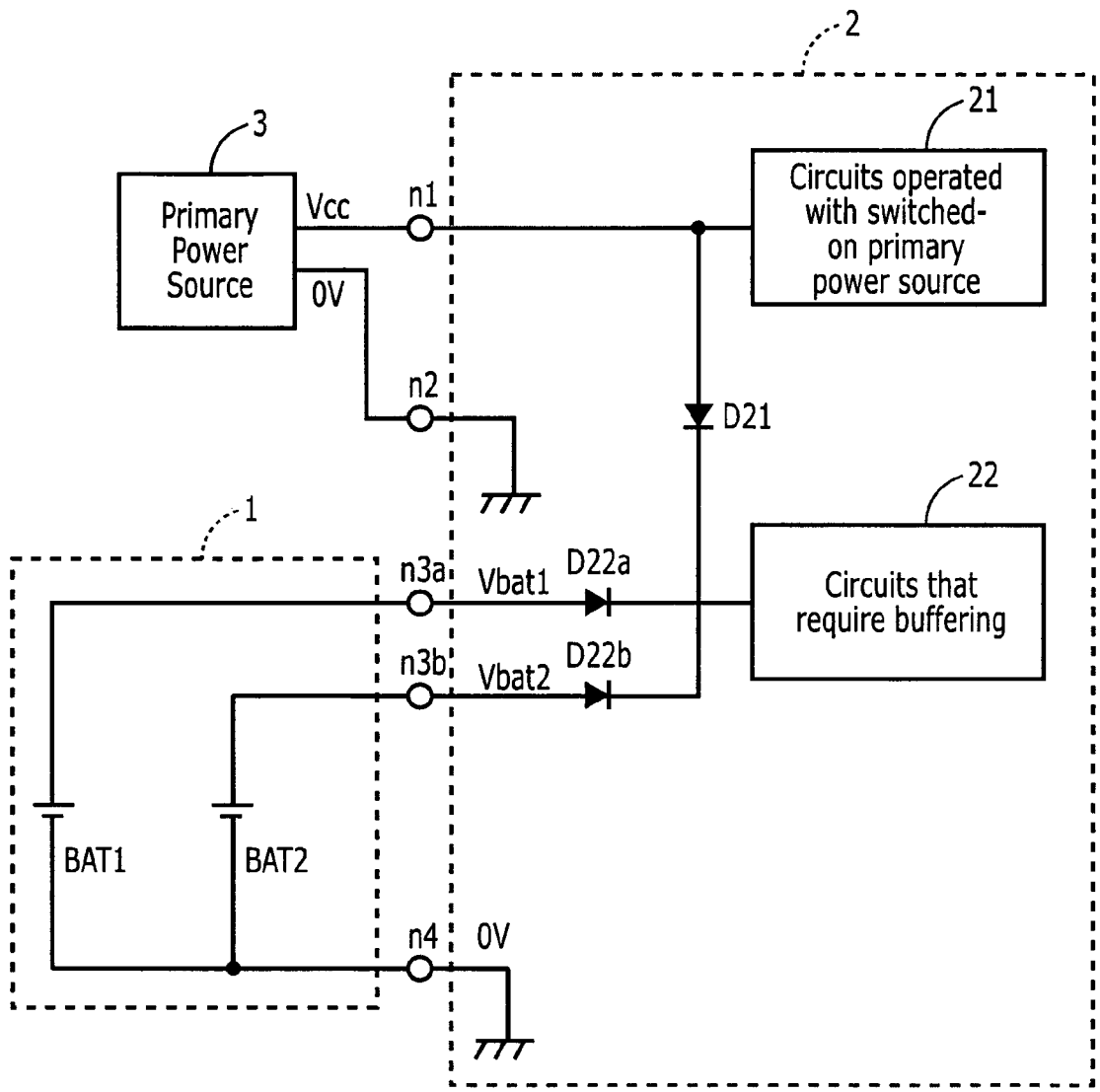
FIG. 2 is a circuit diagram which illustrates an example embodiment of a device of the present invention.

FIG. 2 is a circuit diagram which illustrates an example embodiment of the present invention. In the Figure, in backup current source 1 only one main battery BAT1 and one auxiliary current source BAT2 are provided. Node n3 of FIG. 1 is divided into a node n3a and a node n3b, which respectively connect main battery BAT1 and auxiliary battery BAT2. Diodes D22a and D22b are respectively connected to nodes n3a and n3b, which, in turn, are connected to the circuits that require buffering. This means that, by arranging diodes D1 and D2 of FIG. 1 on the inside of encoder main part 2, a diode OR circuit is formed, e.g., as in FIG. 1. Additional features correspond to those illustrated in FIG. 1. The same or similar features are provided with the same reference characters.

In this example embodiment, the number of terminals is been increased by the extent of the division by two of nodes n3 into a node n3a and a node n3b, but the number of diodes has been reduced by "one," and there are no diodes in the backup current source. Therefore, since, during maintenance of this section by the customer, a commercial battery may be used as is, this may be extremely beneficial with regard to maintenance.

EXAMPLE EMBODIMENT 3

Figure 3:
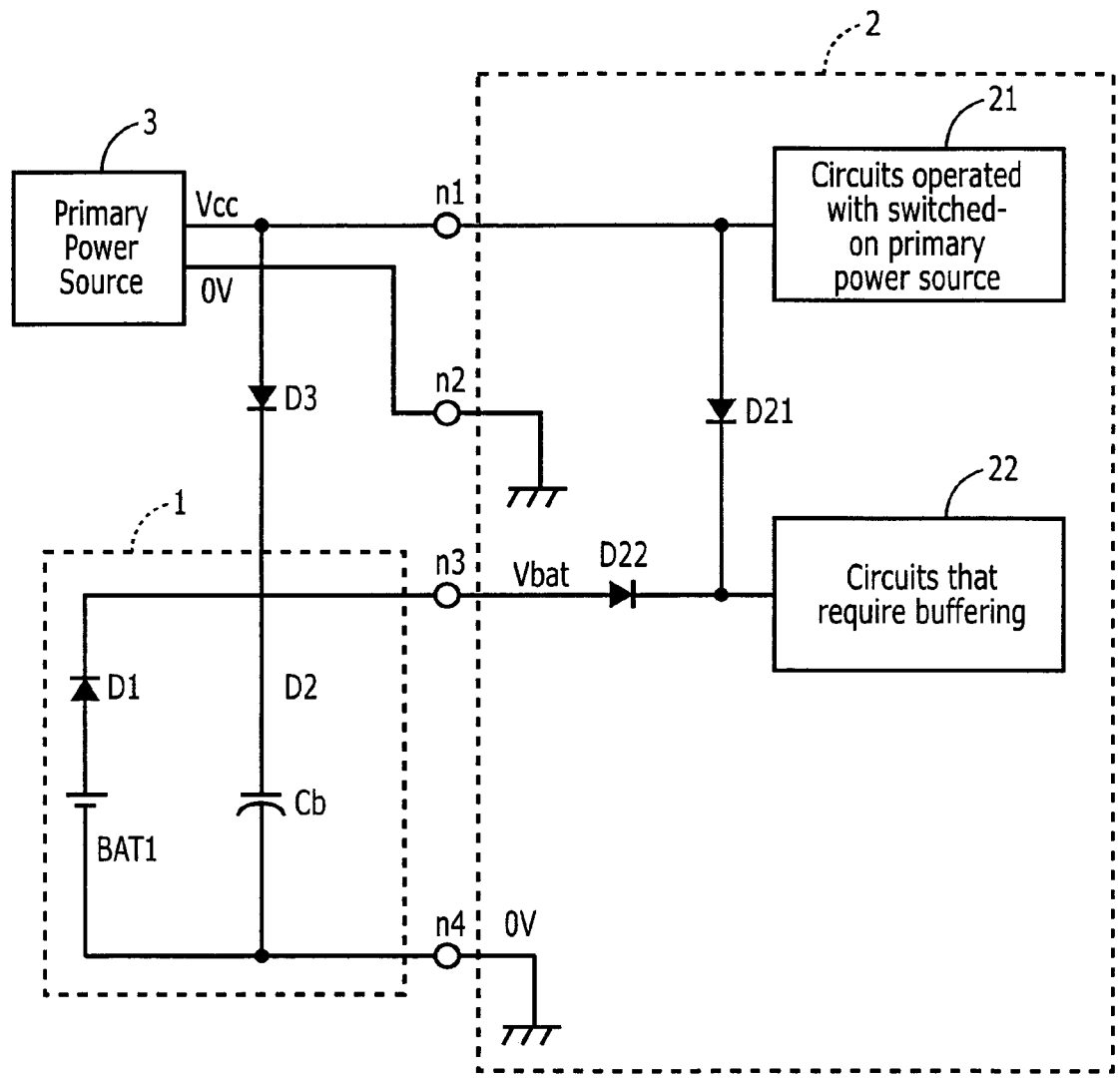
FIG. 3 is a circuit diagram which illustrates an example embodiment of a device of the present invention.
Figure 4:
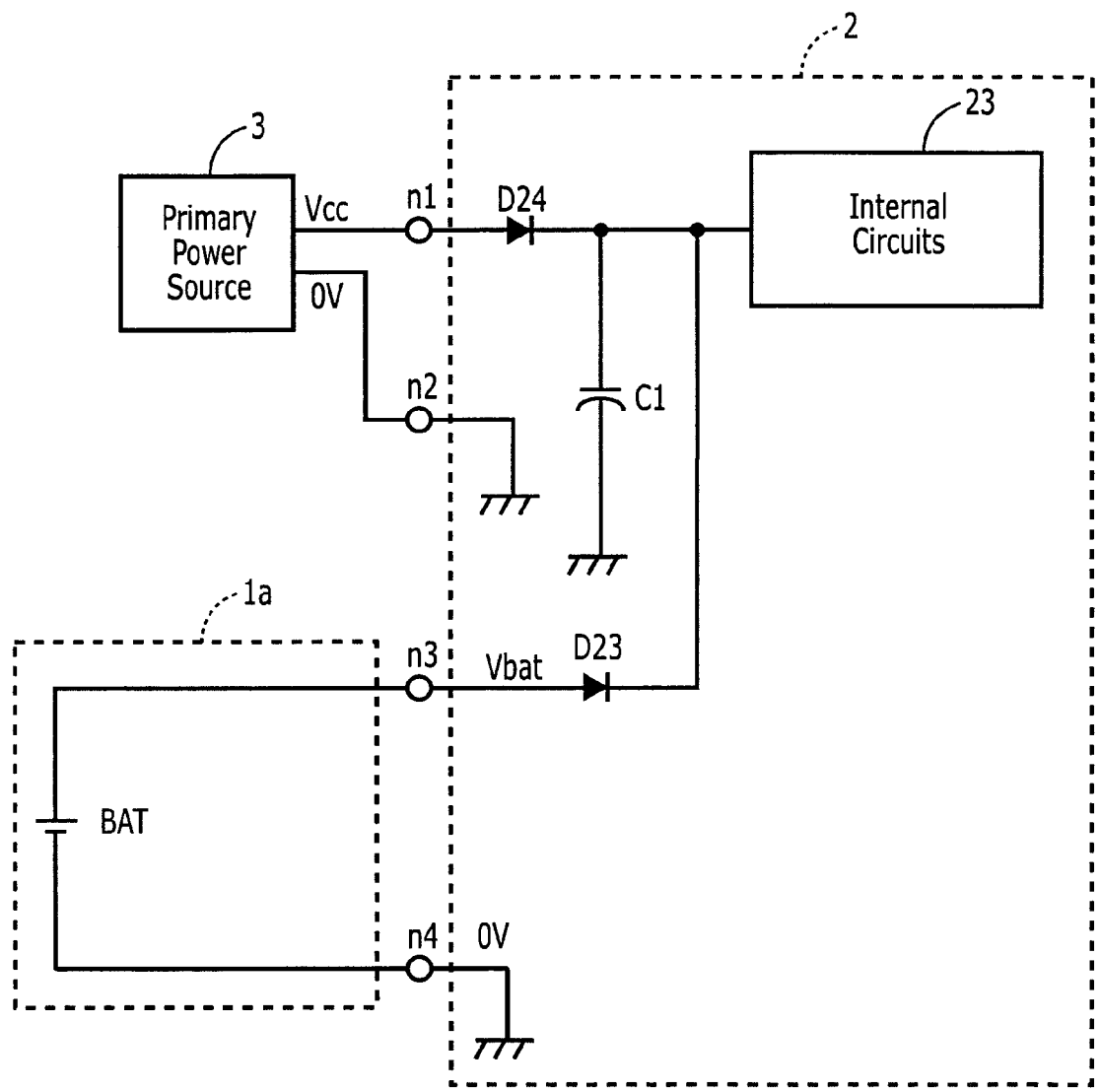
FIG. 4 is a circuit diagram that illustrates the construction of a backup current source of a conventional encoder device.

FIG. 3 is a circuit diagram that illustrates an example embodiment of the present invention. In the Figure, a main battery BAT1 and a capacitor Cb are arranged as an auxiliary current source in backup current source 1. Main current source 3 and capacitor Cb are connected via a diode D3, and when main current source 3 is switched on, current having a voltage Vcc is supplied, and capacitor Cb is charged.

The two ends of capacitor Cb are connected in parallel to the serial circuit of main battery BAT1 and of diode D1, and to nodes n3 and n4. That means that capacitor Cb is connected in place of battery BAT2 as auxiliary current source and of diode D2 of FIG. 1. Additional features correspond to those illustrated in FIG. 1. The same or similar features are provided with the same reference characters.

By using capacitor Cb as auxiliary current source, main battery BAT1 may consequently be exchanged, as with battery BAT2, even without the availability of a capacitor, etc., on the inside of encoder main part 2. Since capacitor Cb, during normal operation, is charged by normal current source 3, it is also able to be used several times within the charging and discharging range, which may be economical since even the necessity of an exchange because of wear may be omitted.

In addition, since, in this example embodiment, the four nodes n1 to n4 may be sufficient for the terminals for connecting encoder main part 2 to the outside, the arrangement hereof may be realized without changing the number of terminals of the customary units, which may also be extremely economical.

Example embodiments of the present invention may be applied in the case of encoders that are used for the determination of position of varied kinds of movable parts, such as moving elements of industrial machines such as robots or, automotive machines, automobiles, aircraft, etc. A technology is involved which may be suitable, e.g., for multi-rotational absolute encoders, but besides that, may also be used for position measuring devices that require a standby mode by buffering in the case of interruption of the main current source, such as linear encoders, etc.

What is claimed is:

1. A position measuring device, comprising:
    an encoder main part configured to measure an extent of a shift in position of an object to be measured, the encoder main part including first partial circuits and second partial circuits;
    a backup current source configured to supply backup current to only the second partial circuits of the encoder main part upon interruption of a main current source that supplies current to both the first partial circuits and the second partial circuits of the encoder main part, the backup current source including a main battery; and
    an auxiliary current source arranged outside of the encoder main part configured to supply the backup current to only the second partial circuits during an exchange of the main battery of the backup current source.

2. The position measuring device according to claim 1, wherein the backup current source is configured to supply the backup current only to circuits of the encoder main part that require buffering.

3. The position measuring device according to claim 1, wherein the backup current source includes a battery.

4. A position measuring device, comprising:
    encoder main part means for measuring an extent of a shift in position of an object to be measured, the encoder main part means including first partial circuit means and second partial circuit means;
    backup current source means for supplying backup current to only the second partial circuit means of the encoder main part means upon interruption of a main current source that supplies current to both the first partial circuit means and the second partial circuit means of the encoder main part means, the backup current source means including main battery means; and
    auxiliary current source means arranged outside of the encoder main part means for supplying the backup current to only the second partial circuit means during an exchange of the main battery means of the backup current source means.

5. The position measuring device according to claim 4, wherein the backup current source means is for supplying the backup current only to circuit means of the encoder main part means that require buffering.

6. The position measuring device according to claim 4, wherein the backup current source means includes battery means.

7. The position measuring device according to claim 1, wherein the second partial circuits includes only circuits of the encoder main part that require buffering.

8. The position measuring device according to claim 1, wherein the auxiliary current source includes a capacitor.

9. The position measuring device according to claim 1, wherein a reverse current prevention device is arranged between the second partial circuits and the first partial circuits to prevent the backup current from flowing toward the first partial circuits upon the interruption of the main current source.

10. The position measuring device according to claim 1, wherein the backup current source and the auxiliary current source are connected to the encoder main part by at least one reverse current prevention device.

11. The position measuring device according to claim 1, wherein the backup current source and the auxiliary current source are connected to the second partial circuits by at least one reverse current prevention device.

12. The position measuring device according to claim 1, wherein the backup current source and the auxiliary current source are connected to the second partial circuits by respective reverse current prevention devices.

13. The position measuring device according to claim 1, wherein the main current source is connected to the encoder main part by first nodes, and the backup current source and the auxiliary current source are connected to the encoder main part by common second nodes.

14. The position measuring device according to claim 1, wherein the main current source is connected to the encoder main part by first nodes, and the backup current source and the auxiliary current source are connected to the encoder main part by a common second node and respective third nodes.

15. The position measuring device according to claim 1, wherein the current supply to the first partial circuits is capacitorless.

16. The position measuring device according to claim 8, wherein the capacitor is connected to the main current source by a reverse current prevention device adapted to prevent current flow toward the main current source from the capacitor upon interruption of the main current source.

17. The position measuring device according to claim 4, wherein the second partial circuit means includes only circuit means of the encoder main part means that require buffering.

* * * * *